(12) United States Patent
Brusberg

(10) Patent No.: US 9,988,039 B2
(45) Date of Patent: Jun. 5, 2018

(54) METHOD FOR OPERATING A DRIVE APPARATUS AND CORRESPONDING DRIVE APPARATUS

(71) Applicant: AUDI AG, Ingolstadt (DE)

(72) Inventor: Alexander Brusberg, Königsmoos (DE)

(73) Assignee: AUDI AG, Ingolstadt (DE)

( * ) Notice: Subject to any disclaimer, the term of this patent is extended or adjusted under 35 U.S.C. 154(b) by 0 days. days.

(21) Appl. No.: 15/616,312

(22) Filed: Jun. 7, 2017

(65) Prior Publication Data
US 2017/0349158 A1    Dec. 7, 2017

(30) Foreign Application Priority Data

Jun. 7, 2016    (DE) ........................ 10 2016 006 976

(51) Int. Cl.
| | | |
|---|---|---|
| *B60W 10/08* | (2006.01) |
| *B60K 6/445* | (2007.10) |
| *B60L 11/14* | (2006.01) |
| *B60L 15/20* | (2006.01) |
| *B60W 10/02* | (2006.01) |
| *B60W 10/06* | (2006.01) |

(52) U.S. Cl.
CPC ............ *B60W 10/08* (2013.01); *B60K 6/445* (2013.01); *B60L 11/14* (2013.01); *B60L 15/2054* (2013.01); *B60W 10/023* (2013.01); *B60W 10/06* (2013.01); *B60L 15/20* (2013.01)

(58) Field of Classification Search
CPC ..... B60W 10/08; B60W 10/023; B60L 11/00; B60L 11/14; B60L 15/20
See application file for complete search history.

(56) References Cited

U.S. PATENT DOCUMENTS

| | | | | |
|---|---|---|---|---|
| 9,102,327 | B2* | 8/2015 | Tanishima | ............... B60K 6/48 |
| 9,458,811 | B2* | 10/2016 | Wang | .................... B60W 20/40 |
| 9,623,867 | B2* | 4/2017 | Ashizawa | ............. B60W 10/11 |
| 9,707,969 | B2* | 7/2017 | Yamanaka | .......... B60W 30/192 |
| 2009/0312144 | A1* | 12/2009 | Allgaier | ................... B60K 6/48 |
| | | | | 477/5 |

(Continued)

FOREIGN PATENT DOCUMENTS

| | | |
|---|---|---|
| DE | 10228709 A1 | 2/2003 |
| DE | 10 2008 004 366 A1 | 7/2009 |
| DE | 10 2012 210 871 A1 | 1/2013 |

(Continued)

OTHER PUBLICATIONS

German Office Action dated Sep. 7, 2017, in connection with corresponding DE Application No. 10 2016 006 976.7 (8 pgs.).

(Continued)

*Primary Examiner* — Brian L Swenson
(74) *Attorney, Agent, or Firm* — Maier & Maier, PLLC

(57) ABSTRACT

A method for operating a drive apparatus including an internal combustion engine and an electric engine. An output shaft of the drive apparatus can be operatively connected to the internal combustion engine by way of a shifting clutch and can be permanently operatively connected to the electric engine, so that the output shaft is disengaged from the internal combustion engine in a first shifting state of the shifting clutch and is engaged with it in a second shifting state.

10 Claims, 2 Drawing Sheets

(56) References Cited

U.S. PATENT DOCUMENTS

Figure 1:
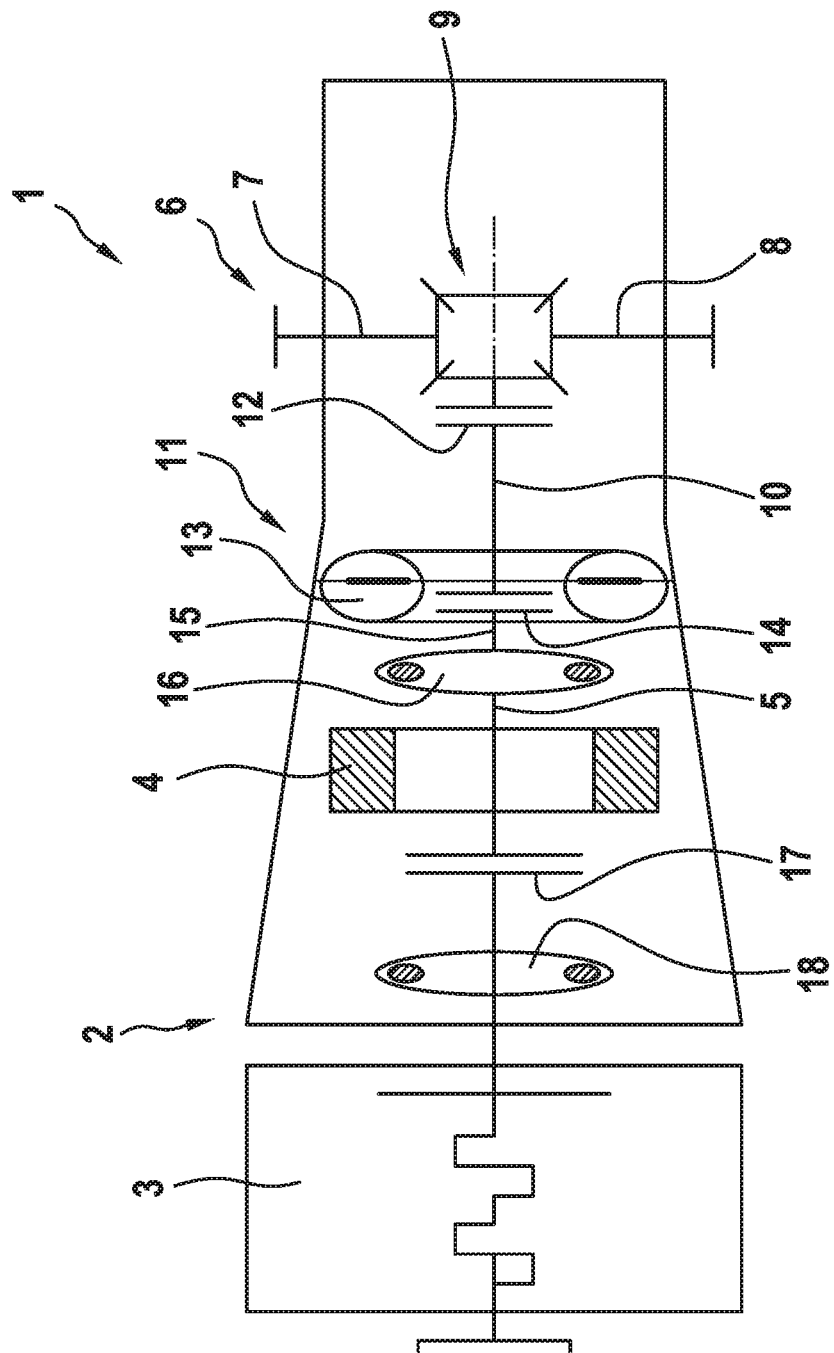

| | | | |
|---|---|---|---|
| 2011/0246008 A1 | 10/2011 | Yoshida et al. | |
| 2011/0287889 A1* | 11/2011 | Eisele | B60K 6/48 477/5 |

FOREIGN PATENT DOCUMENTS

| | | |
|---|---|---|
| DE | 102012211109 A1 | 1/2014 |
| DE | 102012220478 A1 | 5/2014 |
| DE | 102013218082 A1 | 6/2014 |
| DE | 102016005412 A1 | 11/2016 |
| DE | 102016218289 A1 | 4/2017 |
| EP | 1 201 479 A2 | 5/2002 |
| EP | 1 574 378 A2 | 9/2005 |
| EP | 2 008 899 A1 | 12/2008 |

OTHER PUBLICATIONS

Examination Report dated May 22, 2017 of corresponding German application No. 102016006976.7; 10 pgs.

European Search Report dated Oct. 20, 2017 of corresponding European application No. 17171681.4; 13 pgs.

European Search Report dated Apr. 3, 2018, in connection with corresponding EP Application No. 17171681.4 (11 pgs.).

\* cited by examiner

METHOD FOR OPERATING A DRIVE APPARATUS AND CORRESPONDING DRIVE APPARATUS

FIELD

The invention relates to a method for operating a drive apparatus comprising an internal combustion engine and an electric engine, in which an output shaft of the drive apparatus can be operatively connected to the internal combustion engine by way of a shifting clutch and is permanently operatively connected to the electric engine, so that the output shaft is disengaged from the internal combustion engine in a first shifting state of the shifting clutch and is engaged with it in a second shifting state. The invention further relates to a drive apparatus.

BACKGROUND

The drive, apparatus is used, for example, to drive a motor vehicle, thus to provide a torque based on the driving of a motor vehicle. The drive apparatus has multiple drive units, namely a first drive unit switched off as an internal combustion engine and a second drive unit fainted as an electric engine The drive apparatus is present in this respect as a hybrid drive apparatus. The drive apparatus provides the output shaft to which, for example, a multi-gear transmission, particularly a transmission input shaft of the multi-gear transmission, is connected. The multi-gear transmission or the transmission input shaft is preferably rigidly and/or permanently connected to the output shaft. However, it may be also be provided that an additional connection is present between the output shaft and the transmission input shaft or the multi-gear transmission, particularly a shifting clutch, a torque convener, or the like.

The output shaft is permanently operatively connected to the electric engine. For example, the electric engine is arranged coaxially with respect to the output shaft; in particular, the output shaft is directly connected to a rotor of the electric engine. The rotor is preferably positioned on the output shaft. However, other arrangements of the electric engine may also be provided. The shifting clutch is positioned between the internal combustion engine and the output shaft. Accordingly, the internal combustion engine can be operatively connected to the output shaft by way of the shifting clutch, whereby the internal combustion engine is disengaged from the output shaft in the first shifting state of the shifting clutch and is engaged with the output shaft in the second shifting state. In the second shifting state, preferably a slip-free connection is established between the internal combustion engine and the output shaft, thus without a clutch slip in the shifting clutch.

SUMMARY

An object of the invention is to propose a method for operating a drive apparatus, which has advantages compared to the known methods, particularly which enables a reliable and comfortable start of the internal combustion engine by means of a torque provided via the output shaft, particularly a torque provided by the electric engine.

In doing so, a provision is that, during a start of the internal combustion engine from a standstill, a clutch adaptation is undertaken in an adaptation operating mode, wherein a target clutch torque is adjusted on the shifting clutch in such a way that clutch slip is present, and the internal combustion engine is towed to a first target rotational speed without firing and is subsequently towed to a second target rotational speed without firing at a constant target clutch torque, and wherein, after the clutch adaptation, the shifting clutch is completely disengaged and the internal combustion, engine is operated with firing to a synchronous speed that corresponds to the rotational speed of the output shaft.

There is thus a provision in the adaptation operating mode during the start of the internal combustion engine to not only bring it to the synchronous speed, but simultaneously to carry out the clutch adaptation. Within the scope of the clutch adaptation, a clutch characteristic diagram of the shifting clutch is updated. The clutch characteristic, diagram sets the torque transferred from the shifting clutch in relation, to a control value of the shifting clutch, wherein a contact pressure, for example, is used as the control value, particularly if the shifting clutch is designed as a disc clutch. The clutch characteristic diagram in this regard has the target clutch torque as the input variable and the control variable as the output variable. When adjusting the target clutch torque on the shifting clutch, the value of the control variable is accordingly determined by means of the clutch characteristic diagram of the value corresponding to the target clutch torque, and the shifting clutch is operated accordingly. The adjusting of the target clutch torque on the shifting clutch results in this regard in the operating of the shifting, clutch with the control variable determined based on the target clutch torque from the clutch characteristic diagram.

For example, aging and/or wear of the shifting clutch and/or changed environmental, conditions may lead to a deviation between the target clutch torque and the actual clutch torque being transmitted by way of the shifting clutch when the control variable from the target clutch torque is determined based on the clutch characteristic diagram and is used to operate the shifting clutch. For this reason, it is occasionally necessary to undertake the clutch adaptation in order to adapt the clutch characteristic diagram so that the actual clutch torque ideally transferred subsequently via the shining clutch corresponds to the target clutch torque adjusted on it.

The clutch adaptation is carried out during the start of the internal combustion engine when the drive apparatus is operated in the adaptation operating mode. During the start, a provision is to adjust initially the target clutch torque on the shifting clutch, wherein the target clutch torque is selected in such a way that there is a clutch slip of the shifting clutch present. The shifting clutch is consequently not completely engaged so that the internal combustion engine is, not rigidly connected to the output shaft. Subsequently, the internal combustion engine is towed to the first target rotational speed by way of the shifting clutch, that is, by means of the actual clutch torque transferred by way of the shifting clutch.

Once the first target rotational speed is achieved, the internal combustion engine is subsequently also towed to the second target rotational speed without firing, wherein the target clutch torque is maintained at a constant level. The second target rotational speed corresponds, for example, to a minimum speed of the internal combustion engine from which it can be further accelerated without external torque, i.e. solely based on its operation with firing, namely in the direction of the synchronous speed. A constant target clutch torque results in a rotational speed curve for the actual speed of the internal combustion engine with a constant increase in the actual rotational speed. In order to keep the target clutch torque at a constant level between the first target rotational speed and the second target rotational speed, preferably the control, at of the shifting clutch is kept at a constant level or adjusted to achieve the constant target clutch torque.

The actual clutch adaptation is preferably carried out when the actual rotational speed of the internal combustion engine lies between the first target rotational speed and the second target rotational speed, particularly above the overall rotational speed range that is limited by the first target rotational speed, on one end, and the second target rotational speed, on the other end. A sufficiently long period of time is available up to the second target rotational speed, based on the operation without firing of the internal combustion engine.

After the clutch adaptation, i.e. starting from when the second target rotational speed is achieved, the shifting clutch is completely disengaged. Subsequently, die internal combustion engine is operated with firing to the synchronous rotational speed that corresponds to the actual rotational speed of the output shaft. Subsequently, the shifting clutch can be again engaged, particularly in the second shifting state in which it is completely engaged, so that a fixed connection is present between the output shaft and the internal combustion engine. Due to the disengaging of the shifting clutch and the operation with firing of the internal combustion engine, an extremely quick start of the internal combustion engine is achieved despite the implementation of the clutch adaptation.

In a further embodiment of the invention, a provision is that, with the clutch adaptation from a rotational speed gradient of the internal combustion engine, an actual clutch torque is determined and compared to the target clutch torque, wherein, in the event of a deviation between the actual clutch torque and the target clutch torque, an adaptation of a clutch characteristic diagram of the shifting clutch is carried out. Previously, the significance of the clutch characteristic diagram was explained, namely that it is used to concert the target clutch torque into a control variable of the shifting clutch.

For the clutch adaptation, it is now necessary, with a target clutch torque set on the control clutch, to determine the actual torque transferred from the target clutch or the difference between the actual clutch torque and the target clutch torque. At least the rotational speed gradient of the internal combustion engine is used to do this, that is, the rotational speed gradient of the actual speed of the internal combustion engine over time. Other variables can also be included in the actual clutch torque, particularly a moment of inertia of the internal combustion engine and/or a frictional torque of the internal combustion engine, which is typically dependent on speed.

If it is then determined during the clutch adaptation that the actual clutch torque deviates from the target clutch torque, the clutch characteristic diagram is then adapted accordingly, namely in such a way that subsequently, when the target clutch torque is adjusted on the shifting clutch, the actual clutch torque corresponds to it preferably a provision that precisely only one target clutch torque is to be adjusted on the shifting clutch during the, clutch adaptation. However, there may also be a provision that a plurality of different target clutch torques, and consequently a plurality of control variables are adjusted on the shifting clutch, so that a more precise adaptation of the clutch characteristic diagram can take place. In this case, preferably the rotational speed clime of the actual rotational speed of the internal combustion engine has a plurality of sub-curves, wherein one sub-curve is assigned to each target clutch torque.

One enhancement of the invention provides that, before the second target rotational speed is achieved by the internal combustion engine, fuel injection into the internal combustion engine is suppressed and is released after the second target rotational speed is achieved. It has already been indicated above that the internal combustion engine should be operated without firing and/or towed until the second target rotational speed is reached, and that the infernal combustion engines operated with tiring after the second target rotational speed is reached. This is achieved through the suppression and release of the fuel injection in the corresponding rotational speed ranges.

Within the scope of a preferred embodiment of the invention, a provision is that a linear rotational speed curve is used between the first target rotational speed and the second target rotational speed to determine the actual clutch torque. This has also been previously mentioned. Obviously, there may be a provision, however, that the rotational speed curve is compiled from different rotational speed sub-curves, in which the rotational speed sub-curves are each linear but have different rotational speed gradients. With such we of procedure, the adaptation of the clutch characteristic diagram can be undertaken with a plurality of target clutch torques and/or actual clutch torques and accordingly can be more precise.

A further preferred embodiment of the invention provides that the drive apparatus is operated in a normal operating mode arid than only is switched into the adaptation operating mode when a certain number of clutch actuations of the shifting clutch is exceeded since the last clutch adaptation or an adaptation request is present, wherein, after starting the internal combustion engine, during which the clutch adaptation is carried out, there is a switch back to normal operating mode. There is thus a provision that the drive apparatus is not permanently operated in the adaptation operating mode. Instead, there is only a switch into this mode when certain conditions are fulfilled. Otherwise, the drive apparatus is operated in normal operating mode. There may be a provision that the clutch adaptation is omitted in normal operating mode. There may, however, also be a provision that the clutch adaptation additionally occurs in normal operating mode.

For example, there is a switch to the adaptation operating mode when a counter, which counts the number of clutch actuations since the last clutch adaptation, exceeds a certain limit. The counter is reset, for example to zero, when there is a switch into the adaptation operating mode or after the clutch adaptation is carried out. However, there may also be a provision to switch to the adaptation operating mode when it is determined during the start of the internal combustion engine that the actual clutch torque deviates significantly from the target clutch torque, for example, because the actual rotational speed of the internal combustion engine is increasing too quickly or too slowly, i.e., thus generally deviates from an expected rotational speed curve based on the target clutch torque. In this case, the adaptation request is output, or generated.

Another preferred embodiment of the invention provides that the starting of the internal combustion engine in normal operating mode is carried out optionally without firing or with firing, wherein the starting is selected without firing or with firing based on at least one state parameter. Essentially the drive apparatus is designed in such a way that the starting of the internal combustion engine can take place without firing or with firing. A selection is made from these different start operating modes based on the state parameter. The state parameter in this respect is used to decide whether the subsequent starting of the internal combustion engine should be carried out without firing or with firing.

As a state parameter, a delimit speed and/or a default torque is used, for example, which is set on the drive apparatus. The default speed and/or the default torque is specified, for example, by a driver of the motor vehicle by means of a corresponding control means or by a driver assistance means of the motor vehicle.

The invention provides in another embodiment that the internal combustion engine towed to the synchronous rotational speed in normal operating mode until the start without firing via the shifting clutch and only then is the fuel injection released, if the drive apparatus is thus operated in normal operating mode and the internal combustion engine is supposed to be started, particularly from a standstill, it is towed without firing to the synchronous speed through at least partial engagement of the shifting clutch. To this end, the shifting clutch is, in turn, preferably adjusted in such a way that clutch slip is present.

Once the internal combustion engine has reached the synchronous speed, the fuel injection is released; thus operation with filing of the internal combustion engine takes place. In addition, when the synchronous speed is reached, the shifting clutch is preferably completely engaged, i.e. is solidly connected to the output shaft. It is obvious that the internal combustion engine is connected to the output shaft significantly longer during starting without firing than it is during the adaptation operating mode upon the start of the internal combustion engine. Thus, the start without firing in normal operating mode is also suitable for implementing the clutch adaptation. Preferably, the clutch adaptation takes place in normal operating mode during the start without firing. There may be a provision as well, however, that the clutch adaptation is omitted in normal operating mode.

The invention provides ire another embodiment that the internal combustion engine is towed in normal operating mode until the start with firing via the shifting clutch upon released fuel injection until a minimum speed is reached that is less than the second target rotational speed, and subsequently, the shifting clutch disengages and the internal combustion engine is then operated with tiring to the synchronous rotational speed. As an alternative to the start without firing, the internal combustion engine can also be started with firing in normal operating mode. To this end, it is initially towed by way of the shifting clutch, namely up to the minimum speed that is less than the second target rotational speed. Preferably, the minimum rotational speed is at most 50%, at most 40%, or in most 30% of the second target rotational speed. The towing to the minimum rotational speed can take place with firing or without firing.

Starting from the rime the second target rotational speed is reached, the fuel injection is released; thus consequently, the internal combustion engine is operated with tiring and the towing is ended. If the minimum rotational speed is reached, the shifting clutch is disengaged and the internal combustion engine continues to operate with firing until it has reached the synchronous speed. The starting of the internal combustion engine with firing takes place extremely quickly, so that the internal combustion engine can be brought to the synchronous speed very quickly. With the start with firing, the clutch adaptation cannot be carried, out, because the rotational speed gradient of the internal combustion engine not only depends on the actual clutch torque but also on the torque generated by the internal combustion engine.

Finally, within the scope of a further embodiment of the invention, a provision may be that the shifting clutch is completely engaged after the synchronous speed is reached by the internal combustion engine. This may be a provision in the normal operating mode for the start without tiring and for the start with firing as well as in the adaptation operating mode. The internal combustion engine is essentially rigidly connected to the output shaft due to the complete engagement of the shifting clutch. There is no clutch slip in this case.

The invention further relates to a drive apparatus, particularly for carrying oat the method according to the previous embodiments, wherein the drive apparatus has an internal combustion engine and an electric engine, in which an output shaft of the drive apparatus can be operatively connected to the internal combustion engine by way of a shifting clutch and is permanently operatively connected to the electric engine, so that the output shaft is disengaged from the internal combustion engine in a first shifting state of the shifting clutch and is engaged with it in a second shifting state.

In doing so, a provision is that the drive apparatus is designed to carry out a clutch adaptation in an adaptation operating mode, during a starting of the internal combustion engine from a standstill, wherein a target clutch torque is adjusted on the shifting clutch, in such a way that clutch slip is present, and the internal combustion engine is towed to a first target rotational speed without firing, and is subsequently towed to a second target rotational speed without firing with a constant target clutch torque, and wherein, after the clutch adaptation, the shifting clutch is completely disengaged, and the internal combustion engine is operated with firing to a synchronous speed that corresponds to the actual rotational speed of the output shaft.

An indication has already been made as to the advantages of such type of procedure and/or such type of embodiment of the drive apparatus. Both the drive apparatus as well as the method may be further refined according to the aforementioned designs, so that reference is made to them in this respect.

BRIEF DESCRIPTION

Figure 2:
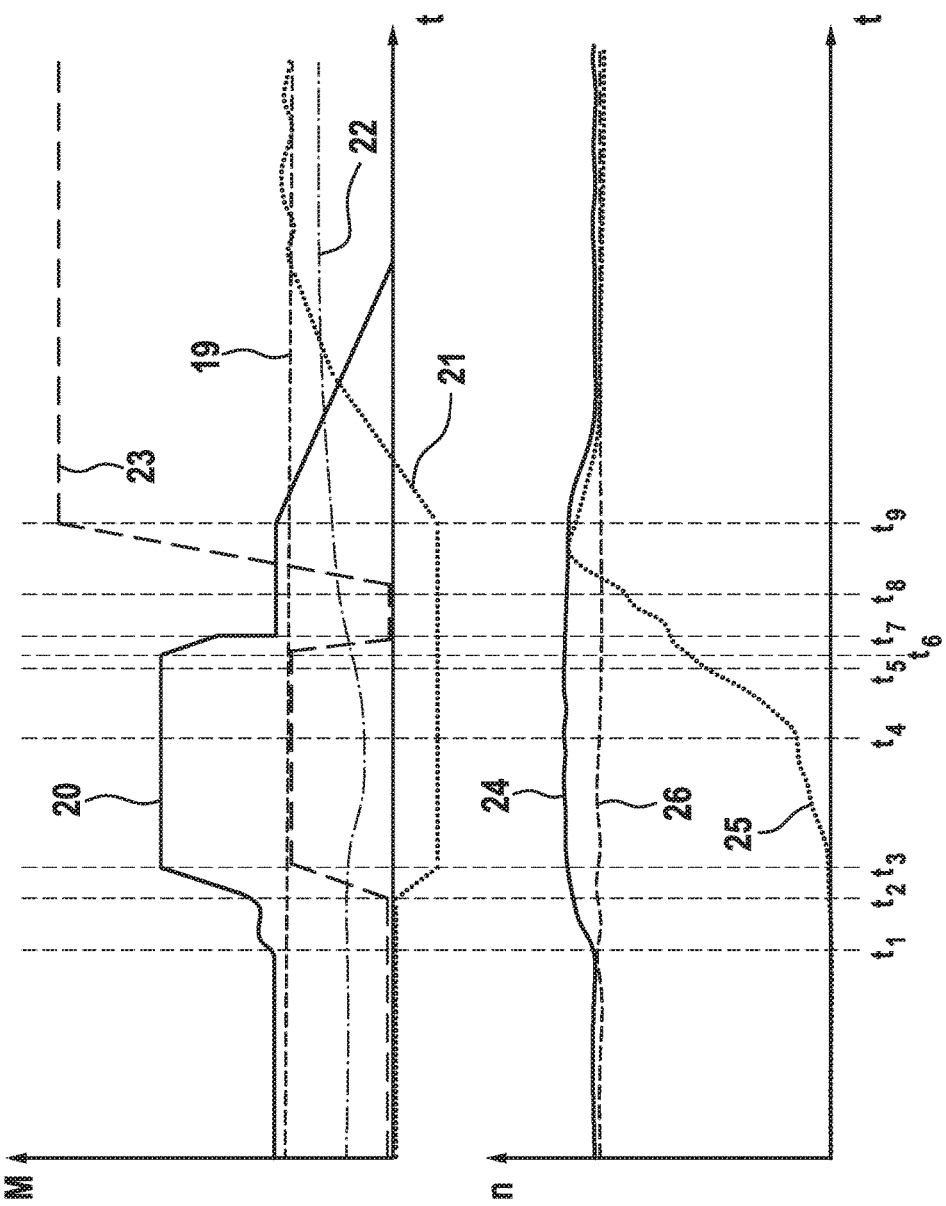

The invention is explained in more detail in the following based on exemplary embodiments, without limiting the invention. The following is shown:

FIG. 1 shows a schematic representation of a drive apparatus comprising, an internal combustion engine and an, electric engine; and FIG. 2 shows two diagrams in which a torque curve and a rotational speed curve are shown for a starting of the internal combustion engine in an adaptation operating mode;

DETAILED DESCRIPTION

FIG. 1 shows a pan of a drive train 1 of a motor vehicle, which is not shown in further detail. The drive train 1 has a drive apparatus 2, which, in turn, has an internal combustion engine 3, an electric engine 4, and an output shaft 5. The drive apparatus 2 is used to drive at least one axle 6 of the motor vehicle, which is composed of two sub axles 7 and 8, and which is connected to a gearbox output shaft 10 of a multi-gear transmission 11 via a differential gear 9. An optional shifting clutch 12 may be present between the gearbox output shaft 10 and the differential gear 9.

A torque convener 13, which may have a converter lockup clutch 14, may be allocated to the multi-gear transmission 11. The multi-gear transmission 11 has a gearbox output shaft 15, which is preferably permanently connected to the torque converter 13. The gearbox input shaft 15 may be directly connected to the output shaft 5 of the drive apparatus 2 or—as shown here—connected by way of a damping apparatus 16, for example, a torsional vibration damper, particularly rigidly and/or permanently.

The electric engine 4 is coaxially arranged with respect to the output shaft 5 and preferably rigidly and/or permanently connected to it. In contrast, an operative connection between the internal combustion engine 3 and the output shaft 5 can be adjusted by a shifting clutch 17. For example, the internal combustion engine 3 is completely disengaged from the output shaft 5 in a first shifting state of the shifting clutch 17, and consequently from the electric engine 4. On the other hand, the internal combustion engine 3 is connected to the output shaft 5 and the electric engine 4, respectively, in a second shifting state of the shifting, clutch 17. The shifting clutch 17 can be connected to the internal combustion engine 3 either directly or indirectly by means of an additional damping apparatus 18. The damping apparatus 18 is preferably designed as a dual mass flywheel.

The drive apparatus 2 may essentially be operated in different operating modes, particularly in a normal operating mode and an adaptation operating mode. In normal operating mode, the internal combustion engine 3 can be started, for example, from a standstill, with the assistance of different start modes, namely optionally without firing or with tiring. With a start of the internal combustion engine 3 without firing, initially the shifting clutch 17 is partially engaged, so that clutch slip is present at the shifting clutch 17. To this end, a corresponding target clutch torque is set on the shifting clutch 17. The actual clutch torque transferred from the output shaft 5 and/or the electric engine 4 by way of the shifting clutch 17 is used to tow the internal combustion engine 3 in the direction of a synchronous speed.

During the start without firing, the internal combustion engine 3 is then towed up to this synchronous speed without firing and fuel injection of the internal combustion engine 3 is not released until then. The target, clutch torque is adjusted on the shifting clutch 17 until the internal combustion engine 3 has reached the synchronous speed. Once this is the case, the shifting clutch 17 can be completely engaged. The shifting clutch 17 is thus always at least partially engaged during the start of the internal combustion engine 3 without firing, so that an actual clutch torque is transferred by way of it, which is greater than zero.

Alternatively, a starting of the internal combustion engine 3 with firing may be provided. To this end the shifting clutch 17 may likewise be at least partially engaged in that a target clutch torque is adjusted on it. This clutch torque is, in turn, selected in such a way that clutch slip occurs. With the assistance of the actual torque transferred by means of the shifting clutch 17, the internal combustion engine 3 is towed without firing up to a minimum speed. If the internal combustion engine 3 has reached the minimum speed, the shifting clutch 17 is disengaged and the internal combustion engine 3 is operated with firing upon released fuel inject on and accelerates in the direction of the synchronous speed. The minimum speed is less than the synchronous speed and/or the second target rotational speed. For example, it corresponds to that minimum speed starting from which the internal combustion engine 3 can accelerate autonomously provided it is operated with firing.

From time to time, it may be necessary to undertake a clutch adaptation during which a clutch characteristic diagram of the shifting clutch 17 is adapted and/or corrected. To this end, a switch is made horn normal operating mode to the adaptation operating mode. If the internal combustion engine 3 is supposed to be started in adaptation operating mode, the clutch adaptation is carried out during the start. In order to start the internal combustion engine 3 in the adaptation operating mode, the target clutch torque is adjusted on the shifting clutch 17 in such a way that clutch slip is present. With the assistance of the actual clutch torque transferred by way of the shifting clutch 17, the internal combustion engine 3 is towed without firing to a first target rotational speed, and subsequently towed without firing with constant target clutch torque to a second target rotational speed. The second target rotational speed can, correspond to the previously mentioned minimum speed.

During the towing from the first target rotational speed to the second target rotational speed, the clutch adaptation is carried out. After the second target rotational speed is reached by the internal combustion engine 3, that is, after completion of the clutch adaptation, the shifting clutch 17 is completely disengaged and the internal combustion engine 3 is operated with firing to the synchronous speed. This corresponds to the actual speed of the output shaft 5. Despite the implementation of the clutch adaptation, a significantly faster start of the internal combustion engine 3 is possible in this manner than in the normal operating mode by means of the start without firing. In addition, there is significantly less clutch load.

FIG. 2 shows two diagrams, wherein the upper diagram reflects the torque curves of a torque M over time t, and the lower diagram shows the rotational speed curves of a speed n over time t. One curve 19 describes a default torque, which is specified by a driver of the motor vehicle. This default torque is initially provided solely by the electric engine 4, the torque curve of which is represented over time by curve 20. The internal combustion engine 3 here is not in operation; thus it is initially not providing any torque. The torque curve of the internal combustion engine 3 is indicated by curve 21. A frictional torque of the internal combustion engine with the respective actual speed of the internal combustion engine 3 is indicated by curve 22. Finally, curve 23 shows the curve of an actual clutch torque of the shifting clutch 17. Curve 24 describes the rotational speed curve of the electric engine 4, curve 25 shows the rotational speed curve of the internal combustion engine 3, and curve 26 describes the speed curve of the output shaft 5 and/or the gearbox input shaft 15.

It is obvious that the torque provided by the electric engine 4 initially corresponds to the default torque. This is the case for $t < t_1$. The internal combustion engine 3 is not in operation, so that its rotational speed is equal to zero. If the internal combustion engine 3 is started in adaptation operating mode, the torque initially provided by the electric engine 4 and consequently its rotational speed is increased for $t_1 \le t < t_2$. Subsequently, a first target clutch torque that is greater than zero is set on the shifting clutch 17. This means that the actual clutch torque, which is preferably equal to the target clutch torque, is impressed on the internal combustion engine 3 via the shifting clutch 17. Correspondingly, the rotational speed starts to increase starting at $t = t_2$.

After the adjustment of the target clutch torque on the shifting clutch 17 at the time $t = t_2$, the actual clutch torque continues to increase during the time period $t_2 \le t < t_3$. Accordingly, the increase in rotational speed of the internal combustion engine 3 also begins to accelerate. The torque provided by the electric engine 4 can be further increased, particularly up to a torque that corresponds to the total of the default torque and of the target clutch torque, in addition, a speed controller portion may be contained in the torque in order to maintain the slip between the electric engine 4 and the gearbox input shaft 15. This is relevant fir any torque errors of the shifting clutch 17 or timing problems between the electric engine 4 and the shifting clutch 17. The internal combustion engine 3 is then towed until it has reached a first target rotational speed. This is the case for time t=t$_4$.

Subsequently, a practically linear increase in the rotational speed of the internal combustion engine 3 results until a second target rotational speed is reached. This is the case for time t=t$_5$. During the time period t$_4$<t<t$_5$, the clutch adaptation of the shifting clutch 17 is carried out. After the second target rotational speed is reached, the shifting clutch 17 is completely disengaged and the internal combustion engine 3 is further accelerated with firing. The disengagement of the shifting clutch 17 starts, for example, at time t=t$_6$ and is completed at time t=t$_7$. It can be seen that the rotational speed of the internal combustion engine 3 reaches the rotational speed of the electric engine 4 in the time period t$_8$≤t<t$_9$ and subsequently synchronizes with it. Accordingly, the shifting clutch 17 starts to engage, starting from time t=t$_8$. The engaged state of the shifting clutch 17 is achieved at time t=t$_9$. In doing so, a target clutch torque is adjusted that is greater than the target clutch torque previously used to start the internal combustion engine 3.

With the assistance of the described procedure, a quick start of the internal combustion engine 3 with the assistance of the electric engine 4 and the implementation of the clutch adaptation are possible, without anything further. In addition, the clutch adaptation is implemented solely in adaptation operating mode, i.e. not for each start of the internal combustion engine 3.

The invention claimed is:

1. A method for operating a drive apparatus comprising:
an internal combustion engine and an electric engine, wherein an output shaft of the chive apparatus can be operatively connected to the internal combustion engine by way of a shifting clutch and is permanently operatively connected to the electric engine, so that the output shaft is disengaged from the internal combustion engine in a first shifting state of the shifting clutch and is engaged with the internal combustion engine in a second shifting state,
wherein, during a starting of the internal combustion engine from a standstill, a clutch adaptation is carried out in an adaptation operating mode, wherein a target clutch torque is adjusted on the shifting clutch in such a way that clutch slip is present, and the internal combustion engine is towed without firing to a first target rotational speed and subsequently towed without firing with a constant target clutch torque to a second target rotational speed, and wherein, after the clutch adaptation, the shifting clutch is completely disengaged, and the internal combustion engine is operated with firing to a synchronous speed, which corresponds to an actual speed of the output shaft.

2. The method according to claim 1, wherein, with the clutch adaptation from a rotational speed gradient of the internal combustion engine, an actual clutch torque is determined and is compared to the target clutch torque, wherein, in the event of a deviation between the actual clutch torque and the target clutch torque, an adaptation of a clutch characteristic diagram of the shifting clutch is carried out.

3. The method according to claim 1, wherein, before the second target rotational speed is achieved by the internal combustion engine, fuel injection into the internal combustion engine is suppressed, and then released after the second target rotational speed is achieved.

4. The method according to claim 2, wherein a linear rotational speed curve is used between the first target rotational speed and the second target rotational speed to determine the actual clutch torque.

5. The method according to claim 1, wherein the drive apparatus is operated in a normal operating mode and then is only switched into the adaptation operating mode when a certain number of clutch actuations of the shifting clutch is exceeded since the last clutch adaptation or an adaptation request is present, wherein, after starting of the internal combustion engine, during which the clutch adaptation is carried out, there is a switch back to normal operating mode.

6. The method according to claim 5, wherein the starting of the internal combustion engine in normal operating mode is carried out optionally without firing or with firing, wherein the starting is selected without firing or with &hut based on at least one state parameter.

7. The method according to claim 5, wherein the internal combustion engine is towed in normal operating mode for the start without firing via the shifting clutch up to the synchronous rotational speed and only then is the fuel injection released.

8. The method according to claim 5, wherein the internal combustion engine is towed in normal operating mode for the start with firing via the shifting clutch upon released fuel injection until a minimum speed is reached that is less than the second target rotational speed, and subsequently, the shifting clutch disengages, and the internal combustion engine is then operated with firing to the synchronous rotational speed.

9. The method according to claim 1, wherein, after the synchronous speed is reached by the internal combustion engine, the shifting clutch is completely engaged.

10. A drive apparatus comprising;
an internal combustion engine and an electric engine, wherein an output shaft of the drive apparatus can be operatively connected to the internal combustion engine by way of a shifting clutch and is permanently operatively connected to the electric engine, so that the output shaft is disengaged from the internal combustion engine in a first shifting state of the shifting clutch and is engaged with the internal combustion engine in a second shifting state, wherein the drive apparatus is designed to carry out a clutch adaptation in an adaptation operating mode during a starting of the internal combustion engine from a standstill, wherein a target clutch torque is adjusted on the shifting clutch in such a way that clutch slip is present, and the internal combustion engine is towed without firing to a first target rotational speed, and subsequently towed without firing with a constant target clutch torque to a second target rotational speed, and wherein, after the clutch adaptation, the shifting clutch is completely disengaged and the internal combustion engine is operated with firing to a synchronous speed, which corresponds to an actual speed of the output shaft.

* * * * *